United States Patent Office 3,558,779
Patented Jan. 26, 1971

3,558,779
ANTI-SECRETORY COMPOSITIONS CONTAINING XANTHEN DERIVATIVES AND USES THEREFOR
Stewart Sanders Adams, Bernard John Armitage, Norman William Bristow, and Bernard Vincent Heathcote, Nottingham, England, assignors to Boots Pure Drug Company Limited, Nottingham, England, a British company
No Drawing. Continuation-in-part of application Ser. No. 643,057, June 2, 1967. This application Aug. 23, 1967, Ser. No. 662,586
Claims priority, application Great Britain, Sept. 2, 1966, 39,384/66; Apr. 5, 1967, 15,692/67
Int. Cl. A61k 9/00, 9/04
U.S. Cl. 424—283                                9 Claims

ABSTRACT OF THE DISCLOSURE

Therapeutic compositions of use in treating peptic ulcer contain as an essential active component a compound selected from xanthydrol, thiaxanthydrol, 9-xanthenylamine, 9-thiaxanthenylamine and certain derivatives thereof.

RELATED APPLICATION

This application is a continuation-in-part of our earlier application S.N. 643,057 filed June 2, 1967 and now abandoned.

BACKGROUND OF INVENTION

This invention relates to therapeutic compositions containing xanthydrol, thiaxanthydrol, 9-xanthenylamine, 9-thiaxanthenylamine and derivatives thereof.

Peptic ulceration is a comparatively frequent occurrence and treatment of such a condition is by surgery, by neutralisation of gastric acid using alkaline media such as alumina and magnesia, or absorbents such as magnesium trisilicate, or by administration of anti-secretory drugs which reduce the output of acid in the stomach. It is obviously desirable to avoid surgery if possible, but, up to now, antacid and anti-secretory treatment has not been entirely satisfactory. The action of antacids is almost immediate and is of short duration; this makes it difficult to control nocturnal gastric secretion by the use of antacids. Many anti-secretory agents are anti-chlolinergic substances which give rise to unwanted side effects such as dryness of the mouth, mydriasis and other atropine-like effects.

SUMMARY OF THE INVENTION

We have now discovered that xanthydrol, thiaxanthydrol, 9-xanthenylamine, 9-thiaxanthenylamine and certain of their derivatives are valuable anti-secretory agents, with a specific activity against gastric secretion and without any anti-cholinergic activity, useful for the treatment of peptic ulcer.

According to the present invention there are provided therapeutic compositions which comprise a compound of Formula I

in which Xn represents the group

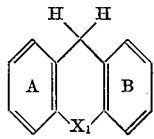

$R_0$ represents $-X_2R$, $NR_1R_2$, or $N(R_3)NR_4R_5$;
$X_1$ is oxygen or sulphur;
$X_2$ is oxygen or sulphur;

R is hydrogen, alkyl, substituted alkyl, cycloalkyl, alkylcycloalkyl, aryl, substituted aryl or acyl;
$R_1$ is hydrogen, alkyl, substituted alkyl, cycloalkyl, hydroxy, alkoxy or, when $R_2$ is not hydrogen, acyloxy;
$R_2$ is hydrogen, alkyl, substituted alkyl, cycloalkyl, or Xn; or $NR_1R_2$ represents piperidino, pyrrolidino, hexamethyleneimino, imidazolyl, triazolyl, morpholino, thiomorpholino, tetrahydroisoquinolyl, benzimidazolyl, or one of these heterocyclic radicals substituted by alkyl of hydroxyalkyl;
$R_3$ is alkyl or acyl;
$R_4$ is alkyl, acyl or, when $R_3$ is acyl, hydrogen;
$R_5$ is hydrogen, alkyl or Xn;

and the rings A and/or B may optionally contain substituents; or an ester of a compound of Formula I containing a carboxyl group; or a salt of a compound of Formula I; in association with pharmaceutical excipients known for the production of compositions suitable for oral, rectal or parenteral administration.

The term "alkyl" is used herein to indicate such groups containing up to 7 carbon atoms.

DETAILED DESCRIPTION OF INVENTION INCLUDING PREFERRED EMBODIMENTS

Examples of types of substituents which may be present when R is substituted alkyl include halogen, alkoxy, aryloxy, aryl, hydroxy, Xn—O— and the group $NR_6R_7$, wherein $R_6$ and $R_7$ represent hydrogen, alkyl, cycloalkyl, phenyl or phenylalkyl, or $R_6$ and $R_7$ together with the nitrogen atom to which they are attached forms a 5- to 7-membered ring heterocyclic radical. Specific examples are chloro, amino, methylamino, phenylamino, dimethylamino, benzylamino, piperidino, morpholino, thiomorpholino, piperazinyl, 4-methyl-1-piperazinyl, 1-pyrrolidinyl, 1-pyrrolyl, 1-imidazolyl, ethoxy, phenoxy, phenyl and 9-xanthenyloxy.

Examples of types of substituents which may be present when R is substituted aryl include halogen, amino, alkylamino, dialkylamino, alkyl, phenoxyalkyl, haloalkyl, aryl, alkoxy, aryloxy, aralkoxy, hydroxy and nitro. Specific examples are chloro, amino, methylamino, dimethylamino, methyl, phenyl, methoxy, phenoxy and phenoxyethyl.

Examples of types of substituents which may be present when $R_1$ or $R_2$ is substituted alkyl include hydroxy, alkoxy, acyloxy, alkylamino, dialkylamino, acylamino and aryl.

Examples of acyl residues include the following: alkanoyl e.g. acetyl, propionyl, butyryl, valeryl, octanoyl, stearyl, pivaloyl, ethoxalyl; substituted alkanoyl e.g. phenylalkanoyl such as phenylacetyl; substituted phenylalkanoyl containing substituents such as halogen, alkyl, alkoxy, hydroxy, amino, alkylamino, acylamino, dialkylamino or nitro in the phenyl ring; phenoxyalkanoyl such as phenoxyacetyl; substituted phenoxyalkanoyl containing substituents such as halogen, alkyl, alkoxy, hydroxy, amino, alkylamino, dialkylamino, acylamino or nitro in the phenyl ring; haloalkanoyl such as beta-chloropropionyl; alkoxyalkanoyl such as methoxyacetyl; alkylthioalkanoyl such as methylthioacetyl; dialkylaminoalkanoyl such as diethylaminoacetyl; acylalkanoyl such as acetoacetyl; cycloalkyl alkanoyl such as cyclohexylacetyl; carboxyalkanoyl such as beta-carboxypropionyl, carboxyalkyenoyl such as beta-carboxacryloyl and similar groups in ester or salt form; heterocyclic alkanoyl such as pyridinesacetyl; alkenoyl e.g. crotonyl; cycloalkanoyl e.g. cyclohexylcarbonyl; aroyl e.g. benzoyl, naphthoyl, substituted benzoyl in which the phenyl ring contains substituents such as halogen, alkyl, alkoxy, hydroxy, amino, acylamino, alkylamino, dialkylamino, nitro or carboxyl (and esters and salts thereof); residues of carbonic acid e.g. alkoxycarbonyl such as methoxycarbonyl, ethoxycarbonyl; aryloxycarbonyl such as phenoxycarbonyl and similar group containing halogen, alkyl, alkoxy, hydroxy, amino, acylamino, alkylamino, dialkylamino, or nitro substituents in the phenyl ring; aralkoxycarbonyl such as benzoyloxycarbonyl; N-substituted carbamoyl e.g. N-arylcarbamoyl such as N-phenylcarbamoyl; N-alkylcarbamoyl such as N-methylcarbamoyl; heterocyclic carbonyl e.g. groups comprising a carbonyl radical attached to a 5- 7-membered heterocyclic ring containing up to two hetero atoms selected from oxygen, sulphur and nitrogen, such as thiophen, tetrahydrothiophen, furan, tetrahydrofuran, pyridine, benzothiazole, benzofuran, xanthen, pyrimidine.

Examples of substituents which may be present in rings A and B include halogen, alkyl, alkoxy and hydroxy.

Examples of esters falling within general Formulae I are those derived from alcohols e.g. methanol, ethanol, benzyl alcohol, and those derived from phenols, Examples of salts falling within general Formulae I are alkali metal, alkaline earth metal, ammonium and organic amine salts of carboxylic acids, and acid-addition salts formed by the basic nitrogen atom and mineral acids e.g. hydrochloric, sulphuric, nitric, phosphoric, and organic acids e.g. acetic, maleic, methanesulphonic embonic.

It will be appreciated that in those hereinbefore described types of substituents in the groups R, $R_1$ and $R_2$ which contain a phenyl nucleus, said nucleus may contain substituents such as halogen, amino, alkylamino, dialkylamino, alkyl, alkoxy, hydroxy and nitro.

The compositions of the invention preferably contain 0.1–90% by weight of a compound of Formula I.

Compositions for oral administration are the preferred compositions of the invention, and these are the known pharmaceutical forms for such administration, such as for example tablets, capsules, syrups and aqueous and oily suspensions. The excipients used in the preparation of these compositions are the excipients known in the pharmacist's art.

Preferred compositions are tablets wherein a compound of general Formula I is mixed with an inert diluent such as calcium phosphate in the presence of disintegrating agents e.g. maize starch and lubricating agents e.g. magnesium stearate. Such tablets may, if desired, be provided with enteric coatings by known methods, for example by the use of cellulose acetate phthalate. Similarly capsules, for example hard or soft gelatin capsules, containing a compound of general Formula I, with or without other excipients, may be prepared by conventional means and, if desired, provided with enteric coatings in known manner. The tablets and capsules may conveniently each contain 25–500 mg. of a compound of general Formula I. Other compositions for oral administration include for example aqueous suspensions containing a compound of general Formula I in aqueous media in the presence of a non-toxic suspending agent e.g. sodium carboxymethylcellulose and dispersing agents, and oily suspensions containing a compound of general Formula I in a vegetable oil for example arachis oil.

Compositions of the invention suitable for rectal administration are the known pharmaceutical forms for such administration, such as for example suppositories with cocoa butter or polyethylene glycol bases.

Compositions of the invention suitable for parenteral administration are the known pharmaceutical forms for such administration, for example sterile suspensions in aqueous and oily media or sterile solutions in propylene glycol.

In the compositions of the invention the compounds of general Formula I may if desired be associated with other compatible pharmacologically active ingredients. For example antacids and acid absorbents such as aluminium hydroxide and magnesium trisilicate may be included in compositions for oral administration to give an immediate antacid effect. Other pharmacologically active agents which may be associated with the compounds of Formula I include compounds active on the central nervous system, including short and long acting sedatives such as the barbiturates and methaqualone, antihistaminic and/or antiemetic agents such as cyclizine and diphenhydramine, and anticholinergic agents such as atropine.

Milk and milk solids are valuable in the treatment of peptic ulcer, and the compositions of the invention include liquid and solid compositions based on milk and milk solids.

For maximum stability, the compositions of the invention should preferably have a pH greater than 7; accordingly acidic excipients are not desirable.

The anti-secretory activity of the compounds of Formula I has been demonstrated in the stimulated, pylorus-ligated rat, and varies with the value of $R_0$ and with the nature and positions of substituents in rings A and B. In general we have found compounds in which $X_1$ is oxygen to be more active than those in which $X_1$ is sulphur, and compounds in which $X_2$ is oxygen to be more active than those wherein $X_2$ is sulphur. Substitution in rings A and B in general reduces activity. Xanthydrol (viz, $X_1=X_2=$oxygen, R=hydrogen) and 9-xanthenylamine (viz, $X_1=$oxygen, $R_1=R_2=$hydrogen) are particularly active compounds. The compounds in which $X_1$ is oxygen and (a) $R_1$ is methyl or ethyl and $R_2$ is hydrogen, (b) $R_1$ and $R_2$ are methyl, (c) $R_1$ is betadimethylaminoethyl and $R_2$ is methyl, (d) $R_1$ is beta-diethylaminoethyl and $R_2$ is methyl, (e) $R_1$ is beta-hydroxyethyl and $R_2$ is hydrogen, (f) $NR_1R_2$ is imadazolyl, and (g) $NR_1R_2$ is 1,2,4-triazolyl, and the rings A and B are unsubstituted, also have good activity. The compounds in which $X_1$ and $X_2$ are oxygen, R is alkyl or alkanoyl, and rings A and B are unsubstituted also have good activity.

The compounds are most conveniently administered orally, the optimum dosage rate varying with the activity of the compounds. A preferred dosage rate is of the order of 0.25–4 g. daily, optionally in divided doses.

General Formula I comprises known and new compounds. Examples of methods which may be used for their preparation are as follows:

(1) Reaction of a 2-chlorobenzoic acid (II) with a phenol or thiophenol (III) in which at least one of the carbon atoms in the o-position to the hydroxy group is unsubstituted, preferably in the presence of copper bronze or cuprous iodide. The resulting diphenyl ether or thioether (IV) is then cyclised, for example by heating with sulphuric acid, and the xanthone or thiaxanthone thus obtained (V) is reduced, for example using sodium amalgam in ethanol, to give compounds of general Formula I in which $X_2$ is oxygen and R is hydrogen.

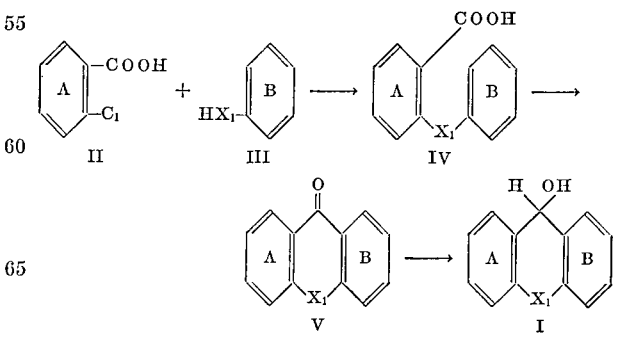

(2) Reaction of a xanthydrol or thiaxanthydrol, or an ester thereof, with an alcohol or a phenol, preferably in the presence of an acid catalyst, to give ethers of Formula I.

(3) Reaction of a xanthydrol or thiaxanthydrol with an acid anhydride in the presence of an acid binding agent to give esters of Formula I.

(4) Reaction of a xanthydrol or thiaxanthydrol with a thiol to give thioethers of Formula I.

(5) In some cases it may be convenient to prepare an intermediate compound containing a substituent readily convertible into the desired substituent, and to convert the intermediate compound to the desired one as the last stage of the preparation. Examples of typical conversions are reduction of a nitro group to an amino group, and hydrolysis of a protected amino group.

(6) Reduction of a xanthenylamide or xanthenylcarbamate by conventional methods e.g. by the use of metal hydrides such as lithium aluminium hydride; the amide or carbamate may be prepared by reaction of a xanthydrol with a primary amide or a primary carbamate, for instance in alcoholic acetic acid;

$$XnOH + R^0CONH_2 \rightarrow XnNHCOR^0 \rightarrow XnNHCH_2R^0$$
$$XnOH + NH_2COOEt \rightarrow XnNHCOOEt \rightarrow XnNHCH_3$$

($R^0CH_2$ = the desired $R_1$.) The amide or carbamate may be treated, if desired, such as by alkylation, to introduce the group $R_2$, and then reduced:

$$XnNHCOR^0 \rightarrow XnN(R_2)COR^0 \rightarrow XnN(R_2)CH_2R^0$$
$$XnNHCOOEt \rightarrow XnN(R_2)COOEt \rightarrow XnN(R_2)CH_3$$

(7) Reduction of a Schiff's base prepared from a xanthenylamine by convetnional methods:

$$XnNH_2 + R^0CHO \rightarrow XnN=CHR^0 \rightarrow XnNHCH_2R^0$$

(8) Condensation of a xanthydrol with an amine or hydrazine, for instance in toluene containing acetic acid Alternatively a xanthydrol acetate may be condensed with an amine or hydrazine:

$$XnOH + R_1NH_2 \rightarrow XnNHR_1$$
$$XnOCOCH_3 + R_1NH_2 \rightarrow XnNHR_1$$
$$XnOCOCH_3 + HN(R_3)NR_4R_5 \rightarrow XnN(R_3)NR_4R_5.$$

(9) A 9-xanthenylamine or 9-xanthenylhydrazine with a hydrogen atom on the nitrogen may be treated, for instance by alkylation or acylation, to introduce $R_1$–$R_5$, e.g.

$$XnNH_2 \rightarrow XnNHMe$$

(10) Dixanthenylamine compounds may be prepared by reaction of xanthylium salt, e.g. ferrichloride, with an amine: e.g.

$$Xn^+FeCl_4^- + R_1NH_2 \rightarrow Xn-N(R_1)-Xn$$

(11) Reduction of a 9-(substituted imino)xanthen, for instance using sodium borohydride or lithium aluminium hydride, to give the corresponding 9-(substituted amino) xanthen: e.g.

$$Xn=N-R_1 \rightarrow XnNHR_1$$

(12) Acyloxy compounds may be prepared by reaction of the corresponding hydroxy compound with an acylating agent capable of providing the desired acyl group. Typical aclylating agents are acid anhydrides and acid halides; in the case of N-substituted carbamoyloxy compounds, the acylating agent may be an isocynate.

Typical compounds of general Formula I which are suitable for inclusion in the compositions of the invention are listed below, by way of non-limitative exemplification only.

9-xanthenylamine
9-methylaminoxanthen
9-ethylaminoxanthen
9-benzylaminoxanthen
9-cyclohexylaminoxanthen
N-9-xanthenylethanolamine
9-(2-ethoxyethyl)aminoxanthen
9-(2-acetoxyethyl)aminoxanthen
N,N-diethyl-N'-9-xanthenylethylenediamine
N-9-xanthenylhydroxylamine
N-methoxy-9-xanthenylamine
9,9'-dixanthenylamine
9-dimethylaminoxanthen
N-benzyl-N-methyl-9-xanthenylamine
N-methyl-N-9-xanthenylhydroxylamine
N-methoxy-9,9'-dixanthenylamine
N-methyl-9,9'-dixanthenylamine
N-methoxy-N-methyl-9-xanthenylamine
N,N,N'-trimethyl-N'-9-xanthenylethylenediamine
N,N'-dimethyl-N-9-xanthenylethylenediamine
N-(2-hydroxyethyl)-N-methyl-9-xanthenylamine
N-(2-ethoxyethyl)-N-methyl-9-xanthenylamine
N-(2-acetoxyethyl)-N-methyl-9-xanthenylamine
O-acetyl-N-methyl-N-9-xanthenylhydroxylamine
O-phenylacetyl-N-methyl-N-9-xanthenylhydroxylamine
O-phenoxyacetyl-N-methyl-N-9-xanthenylhydroxylamine
O-(2-chloropropionyl)-N-methyl-N-9-xanthenylhydroxylamine
O-methoxyacetyl-N-methyl-N-9-xanthenylhydroxylamine
O-methylthioacetyl-N-methyl-N-9-xanthenylhydroxylamine
O-dialkylaminoacetyl-N-methyl-N-9-xanthenylhydroxylamine
O-acetoacetyl-N-methyl-N-9-xanthenylhydroxylamine
O-(2-carboxypropionyl)-N-methyl-N-9-xanthenylhydroxylamine
O-cyclohexylacetyl-N-methyl-N-9-xanthenylhydroxylamine
O-crotonyl-N-methyl-N-9-xanthenylhydroxylamine
O-cyclohexanoyl-N-methyl-N-9-xanthenylhydroxylamine
O-benzoyl-N-methyl-N-9-xanthenylhydroxylamine
O-ethoxycarbonyl-N-methyl-N-9-xanthenylhydroxylamine
O-phenoxycarbonyl-N-methyl-N-9-xanthenylhydroxylamine
O-benzyloxycarbonyl-N-methyl-N-9-xanthenylhydroxylamine
O-(N-methylcarbamoyl)-N-methyl-N-9-xanthenylhydroxylamine
O-2-furoyl-N-methyl-N-9-xanthenylhydroxylamine
O-2-thenoyl-N-methyl-N-9-xanthenylhydroxylamine
O-nicotinoyl-N-methyl-N-9-xanthenylhydroxylamine
O-(9-xanthencarbonyl)-N-methyl-N-9-xanthenylhydroxylamine
O-benzothiazole-2-carbonyl-N-methyl-N-9-xanthenylhydroxylamine
O-benzofuran-2-carbonyl-N-methyl-N-9-xanthenylhydroxylamine
O-pyrimidine-2-carbonyl-N-methyl-N-9-xanthenylhydroxylamine
1-fluoro-9-xanthenylamine
2-chloro-9-xanthenylamine
1-methyl-9-xanthenylamine
2-methoxy-9-xanthenylamine
2-hydroxy-9-xanthenylamine
9-piperidinoxanthen
9-pyrrolidinoxanthen
9-hexamethyleneiminoxanthen
9-morpholinoxanthen
9-thiomorpholinoxanthen
1-9'-xanthenylimidazole
1-9'-xanthenyl-1,2,4-triazole
2-9'-xanthenyl-tetrahydroisoquinoline
1-9'-xanthenylbenzimidazole
2-methyl-1-9'-xanthenylimidazole
4 (or 5)-hydroxymethyl-1-9'-xanthenylimidazole
9-(2-methylpiperidino)xanthen
9-(3-methylpiperidino)xanthen
9-(4-methylpiperidino)xanthen
9-(2-ethylpiperidino)xanthen
9-(2,6-dimethylpiperidino)xanthen
N,N',N'-trimethyl-N-9-xanthenylhydrazine
N,N'-dimethyl-N-9-xanthenylhydrazine
N'-acetyl-N,N'-dimethyl-N-9-xanthenylhydrazine
N-acetyl-N-9-xanthenylhydrazine
N,N'-diacetyl-N-9-xanthenylhydrazine
N,N'-diacetyl-N'-methyl-N-9-xanthenylhydrazine
N,N'-dimethyl-N,N'-di(9-xanthenyl)hydrazine
xanthydrol thiaxanthydrol
1-chloroxanthydrol
2-chloroxanthydrol
3-chloroxanthydrol
4-chloroxanthydrol
1-fluoroxanthydrol
2-fluoroxanthydrol
1-methylxanthydrol
2-methylxanthydrol
3-methylxanthydrol
4-methylxanthydrol
4-methylthiaxanthydrol
2-methylthiaxanthydrol
2-ethylxanthydrol
2-isopropylxanthydrol
2-t-butylxanthydrol
2-s-butylxanthydrol
2-cyclohexylxanthydrol
1-methoxyxanthydrol
2-methoxyxanthydrol
3-methoxyxanthydrol
2-ethoxyxanthydrol
1,2-dimethoxyxanthydrol
1,2-diethoxyxanthydrol
2-t-butyl-4-methylxanthydrol
methyl 9-xanthenyl ether
ethyl 9-xanthenyl ether
isopropyl 9-xanthenyl ether
butyl 9-xanthenyl ether
methyl 9-thiaxanthenyl ether
ethyl 9-xanthenyl thioether
2'-dimethylaminoethyl 9-xanthenyl ether
2'-aminoethyl 9-xanthenyl ether
2'-methylaminoethyl 9-xanthenyl ether
2'-piperidinoethyl 9-xanthenyl ether
2'-chloroethyl 9-xanthenyl ether
2'-hydroxyethyl 9-xanthenyl ether
2'-ethoxyethyl 9-xanthenyl ether
2'-phenoxyethyl 9-xanthenyl ether
benzyl 9-xanthenyl ether
1,2-bis-(9-xanthenyloxy)ethane
2-methyl-9-thiaxanthenyl methyl ether
2,7-dichloroxanthenyl isopropyl ether
ethyl 9-thixanthenyl thioether
phenyl 9-xanthenyl ether
o-chlorophenyl 9-xanthenyl ether
m-methylphenyl 9-xanthenyl ether
p-methoxyphenyl 9-xanthenyl ether
p-aminophenyl 9-xanthenyl ether
p-dimethylaminophenyl 9-xanthenyl ether
4'-biphenylyl 9-xanthenyl ether
p-benzyloxyphenyl 9-xanthenyl ether
p-(2-phenoxyethyl)phenyl 9-xanthenyl ether
p-hydroxyphenyl 9-xanthenyl ether
p-nitrophenyl 9-xanthenyl ether
9-xanthenyl acetate
9-thiaxanthenyl acetate
9-xanthenyl propionate
9-xanthenyl butyrate
9-xanthenyl pivalate
9-xanthenyl phenylacetate
9-xanthenyl phenoxyacetate
9-xanthenyl chloroacetate
9-xanthenyl methoxyacetate
9-xanthenyl aminoacetate
2-methyl-9-thiaxanthenyl acetate
9-xanthenyl benzoate
9-xanthenyl o-chlorobenzoate
9-xanthenyl p-methoxybenzoate
9-xanthenyl m-aminobenzoate
9-xanthenyl p-dimethylaminobenzoate
9-xanthenyl p-nitrobenzoate
9-xanthenyl 2-furoate
9-xanthenyl 2-naphthoate
9-xanthenyl 2-thenoate 9-xanthenyl nicotinate
2'-morpholinoethyl 9-xanthenyl ether
2'-thiomorpholinoethyl 9-xanthenyl ether
2'-(4-ethyl-1-piperazinyl)ethyl 9-xanthenyl ether
2'-hexamethyleneiminoethyl 9-xanthenyl ether
cyclohexyl 9-xanthenyl ether
2-naphthyl 9-xanthenyl ether The following non-limitative examples illustrate the invention.

EXAMPLE 1

A batch of number 0 hard gelatine capsules was prepared, each containing:

| | Mg. |
|---|---|
| Xanthydrol | 300 |
| Maize starch | 96 |
| Magnesium stearate | 4 |

EXAMPLE 2

A batch of spherical soft gelatine capsules was prepared each containing 300 mg. of ethyl 9-xanthenyl ether.

EXAMPLE 3

A batch of 3,000 tablets was prepared from the following ingredients:

Spray dried skimmed milk powder—580 g.
Aluminum hydroxide/magnesium carbonate co-dried gel (as 100% material)—1200 g.
Colouring matter—3.4 ml.
Sodium saccharin—2 g.
Flavouring—17 ml.
Starch—50 g.
Magnesium stearate—50 g.
Talc—16 g.
Xanthydrol—75 g.
Dextrose monohydrate to give a total weight of 4800 g.

The tablets were pressed to a compressed weight of 1.6 g. to give three-quarter inch diameter tablets each containing 25 mg. of xanthydrol.

EXAMPLE 4

In the preparation of tablets the following mixture was dry granulated and compressed in a tabletting machine to give tablets containing 50 mg. of active ingredient:

| | Percent |
|---|---|
| Xanthydrol | 25 |
| Maize starch | 10 |
| Calcium phosphate | 20 |
| Magnesium stearate | 1 |

Microcrystalline cellulose to 100% by weight.

EXAMPLE 5

In the preparation of enteric coated tablets, tablets prepared as described in Example 4 were coated with sanderac varnish and then coated with cellulose acetate phthalate using a solution of 20% cellulose acetate phthalate and 3% diethyl phthalate in a mixture of equal parts of industrial alcohol and acetone.

EXAMPLE 6

In the preparation of capsules a mixture of equal parts by weight of xanthydrol and calcium phosphate was encapsulated in hard gelatin capsules, each capsule containing 50 mg. xanthydrol.

EXAMPLE 7

In the preparation of enteric coated capsules, the capsules of Example 6 were coated with cellulose acetate phthalate in the conventional manner.

EXAMPLE 8

Suppositories weighing 1 g. and containing 50 mg. xanthydrol were prepared in conventional manner using a base of:

| | Percent |
|---|---|
| Polyethylene glycol 4000 | 33 |
| Polyethylene glycol 6000 | 47 |
| Water | 20 |

EXAMPLE 9

A solution for parenteral administration was prepared comprising xanthydrol in propylene glycol, 100 mg./2 ml., sterilised by filtration.

EXAMPLE 10

A batch of number 0 hard gelatin capsules was prepared each containing

| | Mg. |
|---|---|
| 9-xanthenylamine | 300 |
| Maize starch | 96 |
| Magnesium stearate | 4 |

EXAMPLE 11

A batch of spherical soft gelatin capsules was prepared each containing 300 mg. of 9-xanthenylamine.

EXAMPLE 12

In the preparation of tablets mixtures of the following type may be tabletted in conventional manner:

| | Percent by weight |
|---|---|
| Compound of general Formula I | 10–90 |
| Calcium phosphate | 0–80 |
| Maize starch | 5–10 |
| Magnesium stearate | ca. 1 |
| Microcrystalline cellulose | 0–90 |

EXAMPLE 13

The following mixture was dry granulated and compressed in a tabletting machine to give tablets containing 50 mg. of active ingredient:

| | Percent by weight |
|---|---|
| 9-xanthenylamine | 25 |
| Maize starch | 10 |
| Calcium phosphate | 20 |
| Magnesium stearate | 1 |
| Microcrystalline cellulose | to 100 |

EXAMPLE 14

Tablets prepared as described in Example 13 were coated with sanderac varnish and then coated with cellulose acetate phthalate using a solution of 20% cellulose acetate phthalate and 3% diethyl phthalate in a mixture of equal parts of industrial alcohol and acetone.

EXAMPLE 15

In the preparation of capsules a mixture of equal parts of 9-xanthenylamine and calcium phosphate was encapsulated in hard gelatin capsules, each capsule containing 50 mg. 9-xanthenylamine.

EXAMPLE 16

The capsules of Example 15 were coated with cellulose acetate phthalate in the conventional manner.

EXAMPLE 17

Suppositories weighing 1 g. and containing 50 mg. 9-xanthenylamine were prepared in a conventional manner using a base consisting of

| | Percent |
|---|---|
| Polyethylene glycol 4000 | 33 |
| Polyethylene glycol 6000 | 47 |
| Water | 20 |

EXAMPLE 18

A solution for parenteral administration was prepared comprising 9-xanthenylamine in propylene glycol, 100 mg./2 ml., sterilised by filtration.

We claim:

1. A therapeutic anti-secretory composition in the form of a suppository which comprises 0.1–90% by weight of xanthydrol in association with a pharmaceutically acceptable excipient therefor.

2. An enteric-coated tablet or capsule composition which comprises an effective gastric anti-secretory amount of xanthydrol in association with a pharmaceutically acceptable excipient therefor.

3. A composition as claimed in claim 2 containing 25–500 mg. of xanthydrol.

4. A composition as claimed in claim 2 in dosage unit tablet form, said tablet containing 25–500 mg. of xanthydrol.

5. A composition as claimed in claim 2 in dosage unit capsule form, said capsule containing 25–500 mg. of xanthydrol.

6. A method of reducing gastric secretion in a patient suffering from a peptic ulcer which comprises administering to said patient an effective anti-secretory amount of xanthydrol.

7. A method as claimed in claim 6 which comprises administering to a patient 0.25–4 grams of xanthydrol.

8. A method as claimed in claim 6 which comprises administering to a patient 0.25–4 grams of xanthydrol in enteric coated tablet form.

9. A method as claimed in claim 6 which comprises administering to a patient 0.25–4 grams of xanthydrol in enteric coated capsule form.

References Cited

UNITED STATES PATENTS

| | | | |
|---|---|---|---|
| 2,291,194 | 7/1942 | Smith | 424—283 |
| 3,081,233 | 3/1963 | Enz | 424—35 |
| 3,262,934 | 7/1966 | Cusic et al. | 260—335 |
| 2,461,038 | 2/1949 | Cusic | 260—335 |
| 2,480,224 | 8/1949 | Cusic-Robinson | 260—335 |
| 3,290,313 | 12/1966 | Cusic-Yonan | 260—335 |

OTHER REFERENCES

Bond et al., J.A.P.H.A. vol. 43, No. 1, pp. 32–35 (1954).

Okabayashi et al., Chemical Abstracts, vol. 66, p. 255, Abstracting Yagugakuzasshi, vol. 86, (8), 720–6 (1966).

Gilman, Org. Synthesis, coll., vol. I, 2nd ed. p. 554 (1941).

Sawicki, et al., J. Org. Chem., vol. 21, pp. 183–9 (1956).

Pesticide Handbook (1964) Frear, Coll. Science Pubs. State College, Pa., pages 125 and 118.

ALBERT T. MEYERS, Primary Examiner

F. E. WADDELL, Assistant Examiner

GJE-4 CIP

UNITED STATES PATENT OFFICE
CERTIFICATE OF CORRECTION

Patent No. 3,558,779      Dated January 26, 1971

Inventor(s) Stewart Sanders Adams, Bernard John Armitage, Norman William Bristow, and Bernard Vincent H cote of Nottingham, England It is certified that error appears in the above-identified paten and that said Letters Patent are hereby corrected as shown below:

Column 1 - line 64
Appl. page 3 - line 7

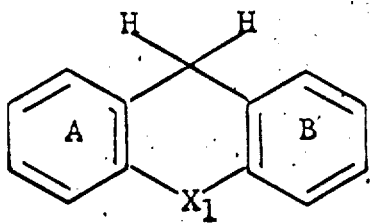   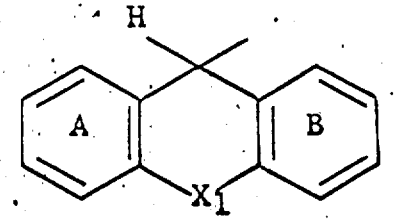

- Column 2 - line 64
  Appl. page 5 - line 14 and
    line 15, respectively

"carboxyalkyenoyl"           -- carboxyalkenoyl --
  "beta-carboxacryloyl"      -- beta-carboxacryloyl -

- Col. 2, line 67
  Appl. page 5 - line 16

"pyridinesacetyl"            -- pyridineacetyl --

- Col. 3 - line 6
  Appl. page 5 - line 29

"benzoyloxycarbonyl"        -- benzyloxycarbonyl --

- Col. 3, line 25
  Appl. page 6 - line 19

"methanesulphonic embonic"     -- methanesulphonic, embc

GJE-4-CIP (2)

UNITED STATES PATENT OFFICE
CERTIFICATE OF CORRECTION

Patent No. 3,558,779  Dated January 26, 1971

Inventor(s) Stewart Sanders Adams, Bernard John Armitage, Norman William Bristow, and Bernard Vincent Heacote, of Nottingham, England It is certified that error appears in the above-identified patent and that said Letters Patent are hereby corrected as shown below:

Col. 5.- line 25
Appl. page 11 - line 20

"convetnional"  -- conventional --

Column 5, line 55
Application page 12 - line 18

"aclylating"  -- acylating --

Column 5, line 57
Application page 12 - line 21

"isocynate"  -- isocyanate --

Signed and sealed this 11th day of May 1971.

(SEAL)
Attest:

EDWARD M. FLETCHER, JR.  WILLIAM E. SCHUYLER, JR.
Attesting Officer  Commissioner of Patents